United States Patent [19]
Heep

[11] Patent Number: 5,206,767
[45] Date of Patent: Apr. 27, 1993

[54] VCR ACCESSORY AND EDITOR

[75] Inventor: Jerry J. Heep, Weatherford, Tex.

[73] Assignee: Tandy Corporation, Forth Worth, Tex.

[21] Appl. No.: 459,014

[22] Filed: Dec. 29, 1989

[51] Int. Cl.⁵ .................. G11B 27/02; G11B 15/18
[52] U.S. Cl. .................. 360/13; 360/72.1; 360/14.1
[58] Field of Search .......... 360/14.1, 14.2, 14.3, 360/72.1, 72.2, 72.3, 74.6, 13

[56] References Cited

U.S. PATENT DOCUMENTS

| | | | |
|---|---|---|---|
| 4,320,423 | 3/1982 | Frey et al. | 360/74.6 |
| 4,394,701 | 7/1983 | Egata et al. | 360/137 |
| 4,411,008 | 10/1983 | d'Alayer de Costemore d'Arc et al. | 360/72.3 |
| 4,663,678 | 5/1987 | Blum | 360/14.3 |
| 4,774,600 | 9/1988 | Baumeister | 360/14.1 |
| 4,989,104 | 1/1991 | Schülein et al. | 360/72.1 |

FOREIGN PATENT DOCUMENTS

| | | |
|---|---|---|
| 0057074 | 8/1982 | European Pat. Off. . |
| 0257534 | 8/1987 | European Pat. Off. . |
| 0242130 | 10/1987 | European Pat. Off. . |
| WO8604722 | 8/1986 | PCT Int'l Appl. . |
| 2088089A | 6/1982 | United Kingdom . |
| 2212649A | 7/1989 | United Kingdom . |
| 2220520A | 1/1990 | United Kingdom . |
| 2226687A | 7/1990 | United Kingdom . |

OTHER PUBLICATIONS

K. J. Hamalainen, Videotape Editing System Using Microprocessor, Jun. 1978 SMPTE Journal vol. 87 pp. 379-382.

Primary Examiner—Wayne R. Young
Assistant Examiner—Varsha V. Sheladia
Attorney, Agent, or Firm—Townsend & Townsend

[57] ABSTRACT

A method and apparatus for editing video cassettes. The video cassette editor can be used to move a video cassette to a particular position on the tape relative to a reference point as a function of tape length expressed in units of time. The video tape editor is also capable of calculating recording speed switchover points for maximizing the recording time in standard play mode and thereby increasing the quality of the video image for the maximum amount of time.

1 Claim, 3 Drawing Sheets

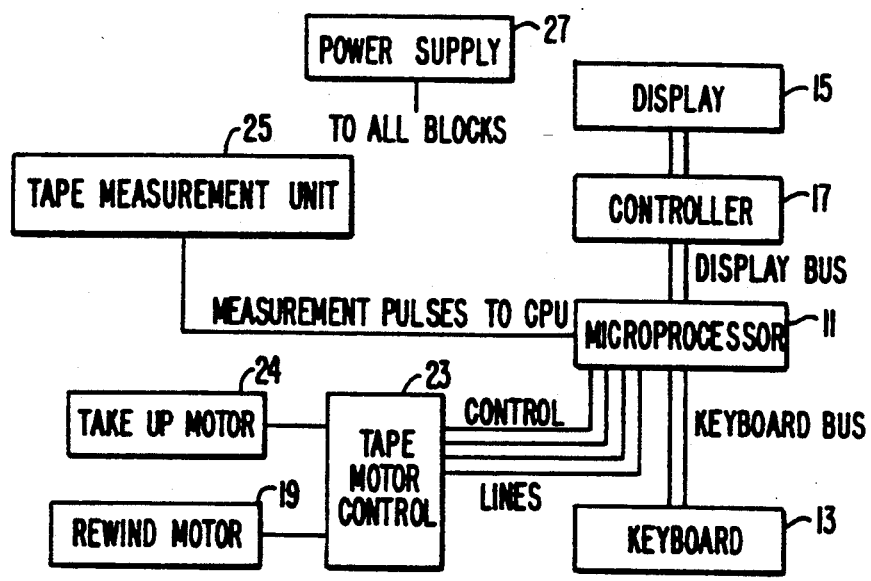
FIG._1.
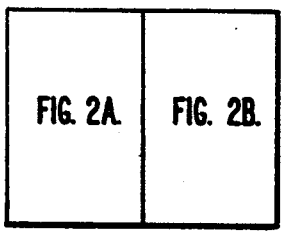
FIG._2.

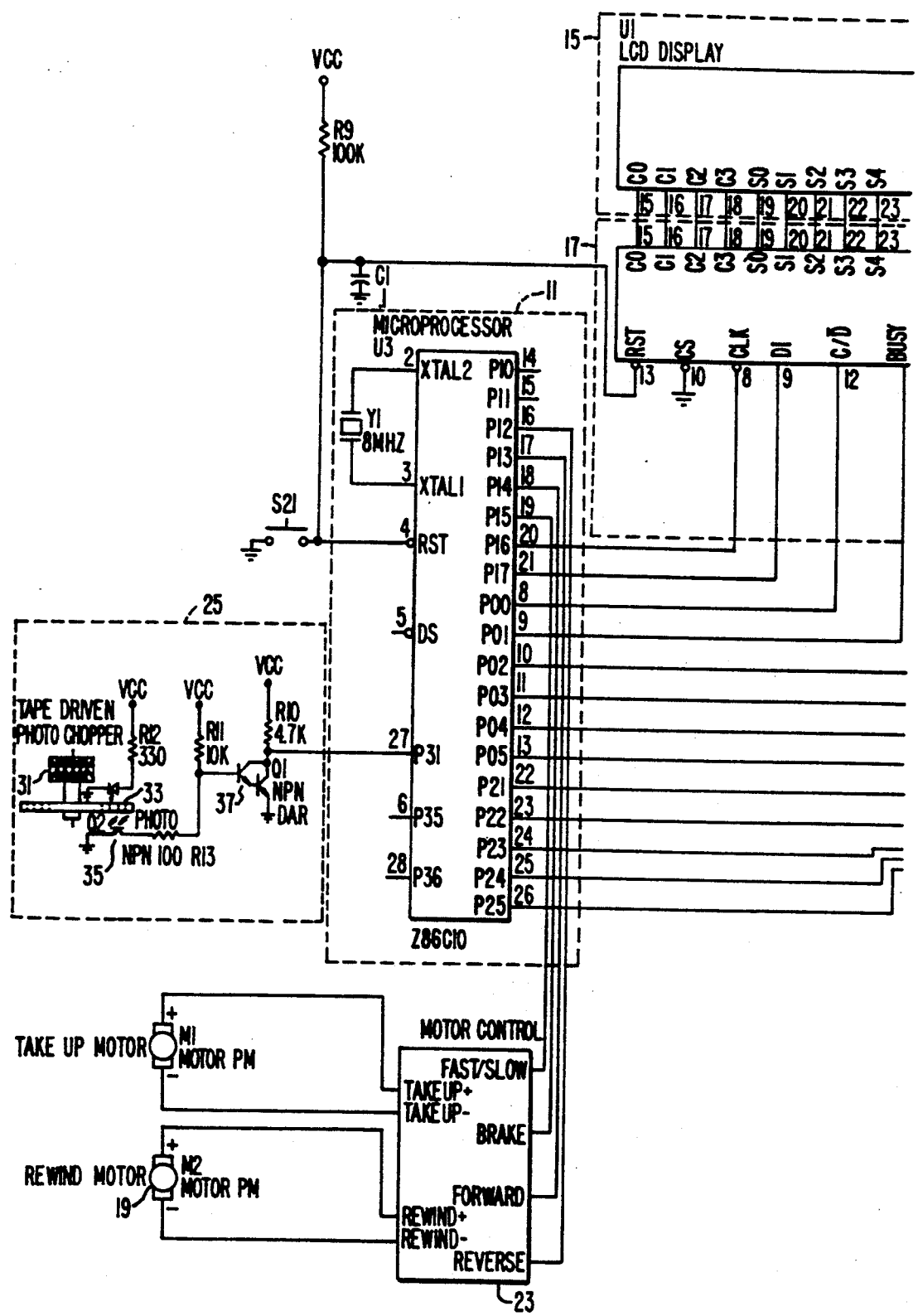
FIG._2A.

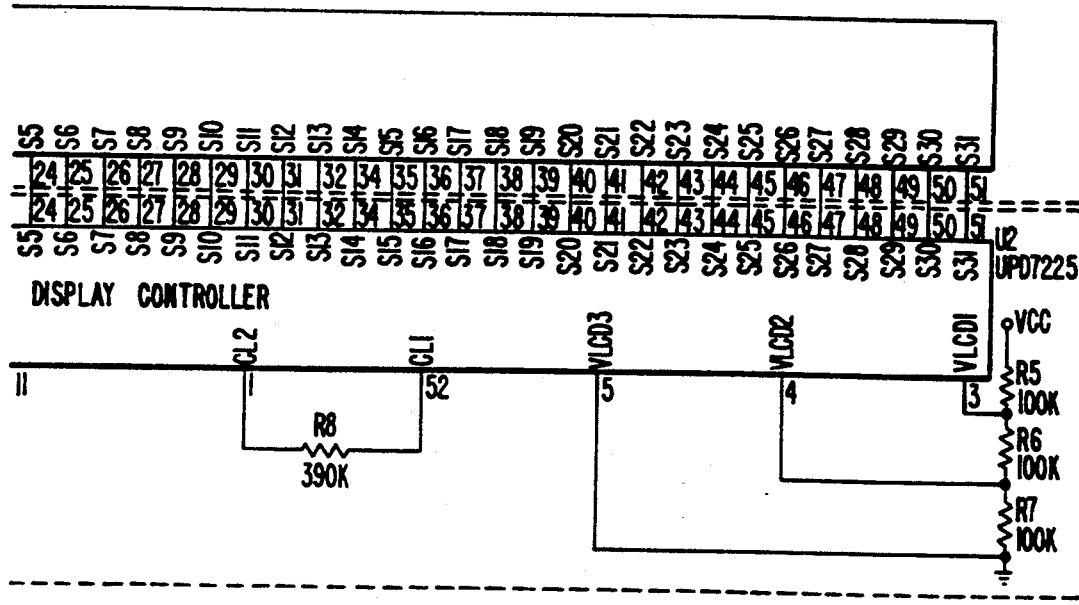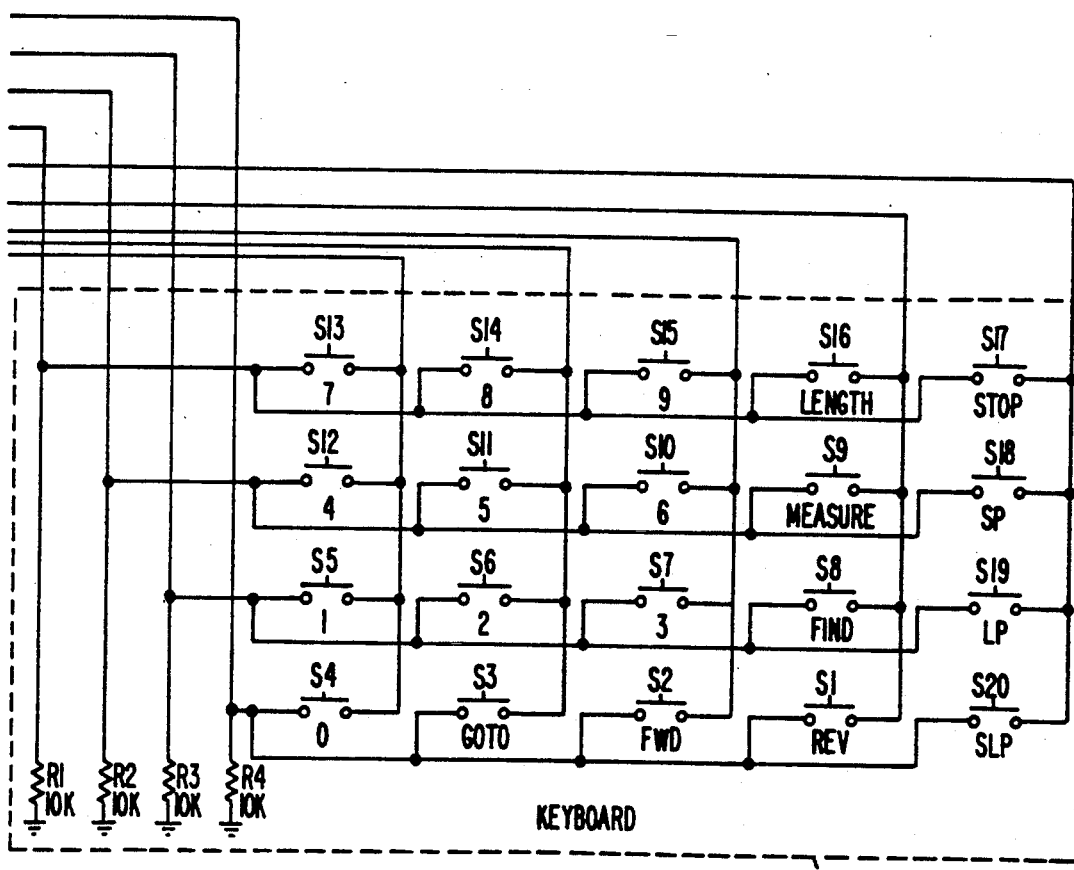
FIG._2B.

VCR ACCESSORY AND EDITOR

BACKGROUND OF THE INVENTION

The present invention relates generally to video cassettes and more particularly to editing programs on a video cassette. Recently, the video cassette recorder has become a popular means for recording and viewing video programming. The editing of such programming has always been difficult because video cassette recorders used to record and play back programming do not include an editing device which can make measurements as a function of time. The only measurement device included in most video cassette recorders is a counter which counts up or down for a specific number of turns of a take-up reel of the video cassette recorder. The only way for a user to advance the tape or rewind the tape by a desired time period is to either guess or fast forward the tape while monitoring the TV set in preview mode. These techniques for measuring can be both frustrating and an inconvenience to the user.

Another type of editing device frequently implemented in video cassette recorders is a memory function which gives the video cassette recorder the capability of rewinding to a specific point if the user has indicated that point before recording or playing of the tape begins. The memory function is useful for keeping track of one programming point on the tape. However, it is quite limited as far as its ability to act as an editing device and does not give a user control over relative length of the tape expressed as a function of time.

One problem associated with editing a video cassette with regard to time functions is that the different sections of tape in the cassette are moving at different take-up reel count rates at any point in time. Portions of tape at the end of the reel count much slower than portions at the beginning of the tape. Therefore, devices for editing which detect the number of turns of tape around the reels are inaccurate because these measurements change as the tape moves from one reel to the other. Another problem is that it is difficult to take into account the tightness of the tape around the reels and the thickness of the tape. Measurements of tape length can be skewed due to these factors.

SUMMARY OF THE INVENTION

The present invention is a tape-editing device for editing and positioning a video cassette at a particular point as a function of tape length expressed in units of time. The tape-editing device can measure and display the total tape length as a function of time. For example, a 120-minute standard video cassette might actually record 126 minutes in the standard play mode. Since the tape-editing device measures the entire tape, a user would be informed that the recording time on a particular video cassette may be more or less than the time period printed on the cassette label.

The present invention provides a user with the ability to measure the current position of the tape. Information is then displayed for the user indicating the amount of time that has been recorded from the beginning of the tape as well as the amount of time which remains until the end of the tape.

A further aspect of the present invention is the ability to preposition the tape to a desired position which the user knows as a function of time. For example, if the user wants to record a 30-minute program and there is a 35-minute free interval on the tape 1½ hours from the start position of the tape in super-long play mode, the user can use the device to preposition the tape to the beginning of the free spot.

The tape editor can be used to move the tape from its current position to another position as a function of time. For example, if the tape is positioned at a particular point and the user would like to move it 30 minutes ahead or 30 minutes back from this point, this information can be input to the tape editor and the tape will be positioned to the desired point.

A further aspect of the present invention is its ability to calculate speed-switching data which may be used to switch the rate of speed at which a tape is being recorded. Most video cassette recorders have three modes of play or record. These modes are standard play mode, longplay mode, and super-long play mode. The present invention has the ability to calculate how long to record at one speed before switching to another speed to maximize the time spent recording in the faster speed. The reason this feature is useful is that it increases the quality of the video image which increases as the speed at which the tape is recorded is increased. Recording speed switching data is useful when a user wants to record a program which is longer than the length of the tape as measured in standard mode. For example, if the tape measures 120 minutes in length the tape editor provides information indicating that the user should record 30 minutes in super-long play mode and the remainder, 110 minutes, in standard play mode to record a total of 140 minutes on the 120-minute tape. Similarly, the tape editor calculates how long to record in long-play mode for the same-length program and how much to record in standard play mode.

Finally, the present invention may be used as a simple tape rewinder for rewinding tapes while a user watches another tape in their video cassette recorder.

The tape editor provides the above-discussed results by keeping track of tape length measured as a function of time at the capstan rotor. The reason for this is that the only place in the video cassette where the tape consistently moves at the same speed is at the section between the tape reels, i.e., the capstan rotor position and the tape head contact position. Further, tape thickness is not a factor in measuring tape length at this point. By placing the measurement means at the capstan rotor, accurate tape length measurements can be made.

For a more complete understanding of the nature and advantages of the invention, reference should be made to the ensuing detailed description taken in conjunction with the accompanying drawings.

BRIEF DESCRIPTION OF THE DRAWINGS

FIG. 1 is a block diagram illustrating the various components and their interconnections in a VCR tape editor;

FIGS. 2A and B are schematic diagrams showing in detail the circuitry of the blocks of FIG. 1.

DETAILED DESCRIPTION OF THE PREFERRED EMBODIMENT

FIG. 1 is a block diagram showing the various components and their interconnections in a VCR tape editor. A microprocessor 11 is used to control most of the other components of the tape editor. Microprocessor II receives instructions from a user on keyboard 13. A user may input instructions for positioning the tape and obtain information from the VCR tape editor. The user receives information on display 15 which is controlled by microprocessor 11 through the use of a standard display controller 17. In a typical embodiment display 15 is a liquid crystal display (LCD) and controller 17 is a standard LCD controller.

The VCR tape editor includes two motors. The first motor is a rewind motor 19 which is used to move the tape in the reverse direction. A take-up motor 21 is used to move the tape in the forward direction. Both rewind motor 19 and take-up motor 21 are controlled by microprocessor 11 through tape motor control 23. Microprocessor 11 can control the speed and direction of the two motors within the VCR tape editor.

As the tape is being moved microprocessor 11 receives pulses from a tape measurement unit 25. These pulses represent tape length which can then be converted to units of time. For example, each pulse could represent a linear tape measurement of 0.1 inch. Since the VCR editor is provided with information of how long it takes for 0.1 inch of tape to pass through the VCR at the different recording speeds microprocessor 11 converts the tape measurement to a time measurement. The VCR tape editor also includes a power supply 27, connected to each of the other components in the VCR tape editor for supplying power to each of these components.

FIGS. 2A and B are schematic diagrams showing the circuitry of each of the components of FIG. 1. Microprocessor 11 is typically a Z86C10 manufactured by Zilog of California. Keyboard 13 includes a group of keys for inputting various data to the VCR tape editor. This data is used by microprocessor 11 to position the tape and provide other information to the user. The keys on keyboard 13 include three mode keys, one each, for setting the mode of the tape speed, a forward key, a reverse key, a measure key, a length key, a find key, a go-to key, keys and numeral 0-9.

The three mode keys are used to select the speed of the tape. The mode may be set to standard play, long play, or super long play. The forward and reverse keys are used to move the tape towards the ends of the tape. Unless used in conjunction with another key, these keys are non-measuring keys.

The measure key is used in conjunction with the forward key or the reverse key to measure tape length expressed in units of time in the forward or reverse direction. The length key converts the measured time into length expressed in feet. For example, if 103 minutes is displayed, the length key would convert this time to 221.45 feet for super long play mode. If converted to standard play mode, the conversion would yield 674.65 feet.

The go-to key is used to command the system to go to a certain point on the tape expressed in units of time. This key is used in conjunction with the numeral keys. A user enters the time of the position she desires and the tape is moved to that spot.

Display 15 is used to provide information to the user about the position and other data regarding the tape. Display 15 is typically a custom LCD display manufactured by Epson of Japan.

Display controller 17 provides control of display 15 to microprocessor 11. Tape motor control unit 23 provides control of rewind motor 19 and take-up motor 21 to microprocessor 11. Tape measurement unit 25 includes a photo chopper 31 used in conjunction with an LED 33 to provide pulses to microprocessor 11 as the tape moves across photo chopper 31. Photo chopper 31 is a plastic disk with small, black lines etched upon its surface. The plastic disk rotates as the tape moves along its surface. It is positioned at the point of the capstan rotor along the portion of tape between the two reels in the video cassette. LED 33 is used to light the disk such that a photo-detector transistor 35 positioned on the opposite side of photo chopper 31 catches the light passing between the lines etched on the disk surface of photo chopper 31. As photo-detector transistor 35 receives these pulses of light, and it transmits them through amplifier 37 and on to microprocessor 11.

In operation, the VCR tape editor may be used to measure the length of a tape. Initially, microprocessor 11 positions the tape at its start position. This is done by activating rewind motor 19 and monitoring the tape-driven photo chopper 31 until no pulses are received. Once the tape is rewound microprocessor 11 measures the total tape length by activating fast-forward motor 21 to move the tape to its end position. The pulses are generated by photo chopper 31 and counted by microprocessor 11 as they are received from photo detector transistor 35. The pulse information is then used to calculate the length of the tape as a function of either distance or time. These values are then displayed on LCD display 15.

Once microprocessor 11 has measured the length of the tape it prepositions the tape to any spot desired by the user. For example, one application would be to create a two-hour super-long play leader for an upcoming recording session and record a 30-minute long-play session first. To perform this function the user would instruct microprocessor 11 to move the tape forward two hours in super-long play mode. Microprocessor 11 would calculate that it would need to fast-forward the tape 258 feet. It would then enable fast-forward motor 21 to position the tape in the proper location. Once the tape has been positioned the user would instruct microprocessor 11 to calculate how much tape would be needed to record the 30-minute session. Microprocessor 11 would display the result of LCD display 15 which would be 97.5 feet of tape.

A further application of the VCR tape editor is to calculate recording speed switching data when recording very long sessions. A video image is improved when recording in a standard play mode. However, since the effective length of the tape is only good for 120 minutes in standard play mode on a standard cassette, it is desirable to maximize the time spent in standard play mode and yet still record material that is beyond the 120-minute programming session. Equations are used to calculate the amount of time to be recorded in super-long play mode so that a maximum amount of time can be spent recording in standard play mode. Similarly, the amount of time to be spent in long-play mode can be calculated such that a maximum amount of time can be spent recording in standard play mode. These equations are as follows:

(1) $SLP(t) = (1.5)(PL) - 180$; and  (1)

(2) $LP(t) = (2)(PL) - 238.2$  (2)

wherein,
SLP(t) = time spent recording in super-long play mode;
PL = the program length;
LP(t) = time spent recording in long-play mode.

These equations are applied where a user records a program which is longer than the length of a standard 120-minute tape recorded in standard play mode. For example, if 135 minutes are to be recorded, the user inputs this information on keyboard 15 and equation (1) is applied in microprocessor 11. The result of applying equation (1) would be that the tape should be recorded in super-long play mode for 22½ minutes while it should be recorded in standard play mode for 112½ minutes. Further, if the user prefers to use the long-play mode instead of the superlong play mode equation (2) would be applied and the tape would need to be recorded in long-play mode for 31.8 minutes and in standard play mode for 103.2 minutes.

In an alternative embodiment of the present invention the capstan tape measurement device is replaced with a take-up reel measurement system.

In the take-up reel measurement system the microprocessor must take into account certain measurement variables. These variables include (1) the diameter of the take-up reel spool; (2) the thickness of the tape being wound onto the spool; and (3) the amount of compression applied to the tape material as it is wound about the takeup reel. Calculations for moving the tape to the measuring point are determined from the following equation:

$$(1)\pi N (D+(N-1)T)=L \qquad (1)$$

wherein, $\pi = 3.1416$;

$= N$ the number of revolutions of the take-up reel;

$D =$ the diameter of the take-up reel hub;

$T =$ the tape thickness;

$L =$ the tape length in inches.

The primary difference between the tape measurement system using the take-up reel and that using the capstan is that the microprocessor unit must first find the current tape time (or length) before adding or subtracting time to the current tape position using the take-up reel system. This is not necessary in the capstan system because the tape can be advanced or rewound by a known number of minutes without knowing the exact position of the tape when it is inserted into the unit.

For example, if a user needs to know how much tape is used on a partially recorded cassette he installs the tape into the device and presses rewind. Microprocessor 11 resets the current count and starts to rewind the tape while counting the revolutions of the take-up reel. Once the tape has been rewound, microprocessor 11 retrieves the take-up reel count. This take-up reel count is applied to the above equation from which microprocessor 11 can calculate the length of tape that is used. Once this calculation is made microprocessor 11 can then calculate the tape length in minutes by dividing the length of the tape by the number of inches per second of tape passed across the tape head in standard play mode. This result is multiplied by 60 seconds.

If the user wants to position the tape to the 90-minute mark for example in standard play mode, he inputs this information on the keyboard. Microprocessor 11 uses the above equation to solve for the number of turns of the take-up reel based on tape length of 90 minutes times 60 seconds times 1.31 inches per second. Solving the above equation for N, the result is 1201 turns of the take-up reel. Microprocessor 11 then fast forwards the tape for this many counts.

To accommodate tapes of varying take-up reel diameter, the unit includes a calibration device for altering the diameter of the take-up reel spool. This value is then inserted into the equation for D. Once the values have been input to the editors, microprocessor 11 can solve for T, based on the given values inserted in the equation.

In general, to those skilled in the art to which this invention relates, many changes in construction and widely differing embodiments and applications of the present invention will suggest themselves without departing from its spirit and scope. For instance, the VCR tape editing device could be adapted for use with an audio cassette. Thus, the disclosures and descriptions herein are purely illustrative and not intended to be in any sense limiting. The scope of the invention is set forth in the appended claims.

What is claimed is:

1. In a tape editing device for determining the relative position of a tape to its start position as a function of tape length expressed in units of time, a method for determining the current position of the tape relative to the start position expressed in units of time, comprising the steps of:

resetting a time counter to a present position count representing a present position on the tape relative to the start position expressed in units of time;

initiating said time counter to start said time counter counting for measuring the length of the tape expressed in units of time;

rewinding the tape to the start position;

recording a start count reached by said time counter, said start count representing the tape length from said present position expressed in units of time;

winding the tape in a forward direction until it reaches the end position;

recording an end count reached by said time counter, said end count representing the tape length from said start position expressed in units of time;

rewinding the tape by a count value equal to said end count minus said present position count; and displaying a time period representing the length of tape expressed in units of time between the present position and the end position equal to said end count minus said present position count and a time period representing the length of tape expressed in units of time between the start position and said present position equal to said present position count minus said start count.

* * * * *